United States Patent
Carrier et al.

(10) Patent No.: US 8,123,486 B2
(45) Date of Patent: *Feb. 28, 2012

(54) SYSTEM FOR MANUFACTURING A ROTOR HAVING AN MMC RING COMPONENT AND A UNITARY AIRFOIL COMPONENT

(75) Inventors: Charles W. Carrier, West Chester, OH (US); Chen-yu J. Chou, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 12/796,294

(22) Filed: Jun. 8, 2010

(65) Prior Publication Data
US 2010/0239428 A1    Sep. 23, 2010

Related U.S. Application Data

(62) Division of application No. 11/557,646, filed on Nov. 8, 2006, now Pat. No. 7,784,182.

(51) Int. Cl.
*F01D 5/02*    (2006.01)
(52) U.S. Cl. ............... 416/213 R; 416/230; 416/229 A; 416/234
(58) Field of Classification Search ............... 416/213 R, 416/230, 229 A, 234
See application file for complete search history.

(56) References Cited

U.S. PATENT DOCUMENTS

| | | | |
|---|---|---|---|
| 3,571,906 A | | 3/1971 | Barth |
| 3,702,169 A | * | 11/1972 | Bonneville et al. ............ 228/2.3 |
| 5,106,012 A | | 4/1992 | Hyzak et al. |
| 5,305,520 A | * | 4/1994 | Doorbar et al. ............ 29/889.21 |
| 5,556,257 A | | 9/1996 | Foster et al. |
| 5,867,885 A | | 2/1999 | Bales et al. |
| 5,946,801 A | | 9/1999 | Twigg et al. |
| 6,077,002 A | | 6/2000 | Lowe |
| 6,524,072 B1 | | 2/2003 | Brownell et al. |
| 6,666,653 B1 | | 12/2003 | Carrier |
| 6,838,162 B1 | | 1/2005 | Gruber et al. |
| 6,869,259 B2 | | 3/2005 | Lebkuechner |
| 6,905,312 B2 | | 6/2005 | Bourgy et al. |

(Continued)

FOREIGN PATENT DOCUMENTS

CN    1636651 A    7/2005

(Continued)

OTHER PUBLICATIONS

Chinese Office Action issued in connection with corresponding CN Patent Application No. 200710169999.2 filed on Nov. 8, 2007.

*Primary Examiner* — Ninh H Nguyen

(74) *Attorney, Agent, or Firm* — McNees Wallace & Nurick

(57) ABSTRACT

A system for manufacturing an integrally bladed rotor is provided. This system includes a ring component, wherein the ring component further includes at least one metal matrix composite and a continuous radially outwardly facing blade conical surface; an airfoil component, wherein the at least one airfoil component has been created from a single, unitary piece of material and further includes a plurality of individual airfoil blades and a continuous radially inwardly facing blade conical surface; and inertia welding means for frictionally engaging under an axially applied weld load the ring component and the airfoil component to effect an inertia weld therebetween along the conical surfaces.

12 Claims, 3 Drawing Sheets

U.S. PATENT DOCUMENTS

| | | |
|---|---|---|
| 6,935,817 B2 | 8/2005 | Sasu et al. |
| 6,969,238 B2 | 11/2005 | Groh et al. |
| 7,007,382 B2 | 3/2006 | Mantel |
| 7,445,433 B2 | 11/2008 | Chivers et al. |
| 7,491,032 B1 | 2/2009 | Powell et al. |
| 2002/0127108 A1 | 9/2002 | Crall et al. |
| 2005/0011070 A1 | 1/2005 | Rice et al. |
| 2005/0071999 A1 | 4/2005 | Bartsch et al. |
| 2005/0084381 A1 | 4/2005 | Groh |
| 2005/0086804 A1 | 4/2005 | Packman et al. |
| 2005/0133121 A1 | 6/2005 | Subramanian |
| 2008/0025844 A1 | 1/2008 | Bayer et al. |
| 2008/0107531 A1 | 5/2008 | Chou et al. |

FOREIGN PATENT DOCUMENTS

| | | |
|---|---|---|
| WO | 2005056983 A1 | 6/2005 |

\* cited by examiner

SYSTEM FOR MANUFACTURING A ROTOR HAVING AN MMC RING COMPONENT AND A UNITARY AIRFOIL COMPONENT

CROSS-REFERENCE TO RELATED APPLICATIONS

This patent application is a divisional of U.S. patent application Ser. No. 11/557,646, now allowed, filed on Nov. 8, 2006.

BACKGROUND OF THE INVENTION

The described invention relates in general to integrally bladed rotors for use in gas turbine engines, and more specifically to a method for preparing a BLING rotor that incorporates at least one metal matrix composite into the ring component of the rotor or the airfoil component of the rotor.

Rotors, such as those used with gas turbine engines typically include a basic rotor body and a plurality of rotor blades attached thereto. Rotor blades may be anchored in specific recesses formed in the rotor body or the rotor blades may be formed integrally with the rotor body itself. Integrally bladed rotors are referred to as BLISKS (bladed disc) if a disc-shaped basic rotor body is utilized or a BLING (bladed ring) if a ring-shaped basic rotor body is utilized. BLING rotors offer distinct advantages over BLISK rotors because the BLING design results in a larger internal cavity than is typically possible with the BLISK design. This cavity provides space within the engine that may be used for additional equipment such as, for example, an embedded electric generator and/or heat exchanger. The BLING design may also provide improved rotor dynamic damping and higher E/rho (by as much as 70%), compared to conventional metal disks, and even to integrally bladed BLISK rotors. The BLING design also enables the use of metal matrix composite (MMC) for the basic rotor body. In the context of gas turbine engines, high strength, low density MMC may offer significant advantages over monolithic metal alloys, including a significant decrease in the weight of engine components.

Known methods for manufacturing MMC reinforced BLING rotors typically utilize hot isostatic pressing (HIP), which includes diffusion bonding of various components. The HIP process consolidates metal matrix composites into higher density, uniform, fine grain structures. However, incorporating an MMC ring into a multi-load path structure, i.e., rotor to blade, is technically challenging and requires a large number of process controls to ensure that no internal defects are present after the structure has been created. A thermal expansion coefficient mismatch between the MMC ring and monolithic material used for the blades may produce a residual compressive stress field along the bonding surface. Resultant internal defects are not detectable using non-destructive inspection techniques; thus, strict process controls must be implemented. Consequently, the expense involved in creating a BLING rotor of suitable quality using MMC and HIP diffusion bonding may be considerable compared to the cost of a BLISK rotor machined from a conventional forging.

Thus, there is a need for a reliable, economically-sound method for manufacturing BLING rotors that incorporate MMC, wherein the completed rotor may be treated to relieve residual compressive stress, and wherein bond surface integrity can be inspected using conventional, non-destructive methods for detecting internal defects.

SUMMARY OF THE INVENTION

The following provides a summary of exemplary embodiments. This summary is not an extensive overview and is not intended to identify key or critical aspects or elements of the present invention or to delineate its scope.

In accordance with one exemplary embodiment, a system for manufacturing an integrally bladed rotor is provided. This system includes at least one ring component, wherein the at least one ring component further includes: at least one metal matrix composite; and a continuous radially outwardly facing blade conical surface; at least one airfoil component, wherein the at least one airfoil component has been created from a single piece of material and further includes: a plurality of individual airfoil blades; and a continuous radially inwardly facing blade conical surfaces; and inertia welding means for frictionally engaging under an axially applied weld load the at least one ring component and the at least one airfoil component to effect an inertia weld therebetween along the conical surfaces.

In accordance with another exemplary embodiment, an integrally bladed rotor is provided. This rotor includes at least one ring component, wherein the at least one ring component further includes: at least one metal matrix composite and a continuous radially outwardly facing conical surface; at least one airfoil component, wherein the at least one airfoil component has been created from a single piece of material and further includes: a plurality of individual airfoil blades; and a continuous radially inwardly facing conical surface; and wherein the at least one ring component and the at least one airfoil component have been frictionally engaged with one another along the conical surfaces by inertia welding means.

In yet another exemplary embodiment, a method for manufacturing an integrally bladed rotor is provided. This method includes providing at least one ring component, wherein the ring component further includes: at least one metal matrix composite; and a continuous radially outwardly facing conical surface; at least one airfoil component, wherein the at least one airfoil component has been created from a single piece of material and further includes: a plurality of individual airfoil blades formed from the single piece of material; and a continuous radially inwardly facing conical surface; and using inertia welding means for frictionally engaging under an axially applied weld load the at least one ring component and the at least one airfoil component to effect an inertia weld therebetween along the conical surfaces. This method also includes the step of subjecting the assembled integrally bladed rotor to heat treatment sufficient to relieve internal stresses generated by inertia welding.

The use of BLING rotors in gas turbine engines can offer significant advantages over other designs. For example, combining airfoil components and rotor rings into a single structure improves strength to weight ratios and gas turbine engine performance, in general. Additional features and aspects of the present invention will become apparent to those of ordinary skill in the art upon reading and understanding the following detailed description of the exemplary embodiments. As will be appreciated, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
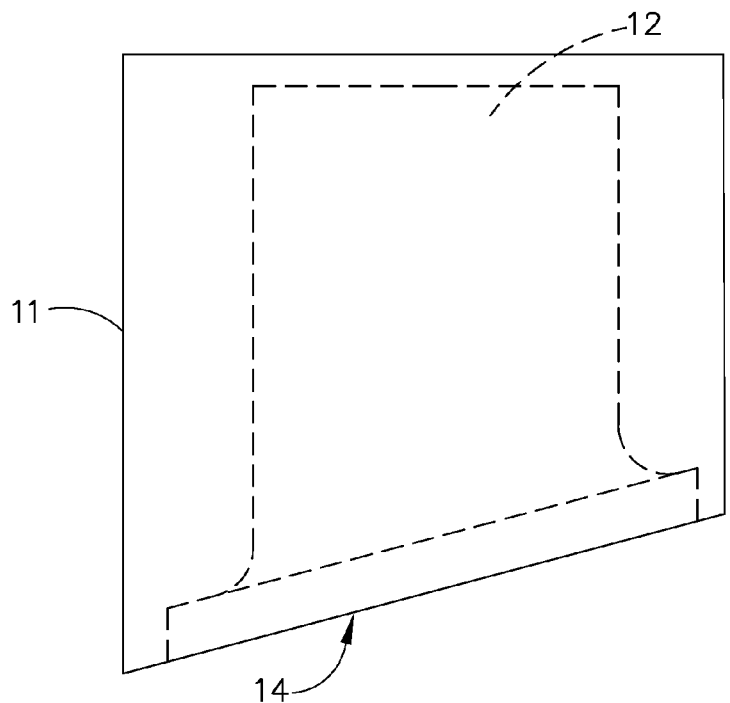
FIGS. 1-2 are a front view of the airfoil component of the present invention showing both the general shape of the airfoil blades prior to the blades being machined from a single piece of material and the general shape of the angular, i.e., conical, prep-weld surface.

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The disclosed system includes at least one ring component, wherein the at least one ring component further includes: at least one metal matrix composite; and a continuous radially outwardly facing conical surface; at least one airfoil component, wherein the at least one airfoil component has been created from a single, unitary piece of material, e.g. metal, and further includes: a plurality of individual airfoil blades formed from the unitary piece of material and a continuous radially inwardly facing conical surface; and inertia welding means for frictionally engaging under an axially applied weld load the at least one ring component and the at least one airfoil component to effect an inertia weld therebetween along the conical surfaces.

Metal matrix composite (MMC) is a composite material that includes at least two constituents, one of which is a metal. The other constituent may be a different metal or another material, such as a ceramic, organic, or other nonmetallic compound. When at least three materials are present, the composite is referred to as a hybrid composite. Each part of the material is either the matrix or a reinforcement. The matrix is essentially the "frame" into which the reinforcement is embedded and may include metals such as aluminum, magnesium, titanium, nickel, cobalt, and iron for providing a compliant support for the reinforcement. The reinforcement material is embedded into the matrix. The reinforcement does not always serve a purely structural purpose (reinforcing the compound), but is also used to affect composite properties such as wear resistance, friction coefficient, material damping, or thermal conductivity. The reinforcement can be either continuous, or discontinuous. Continuous reinforcement uses monofilament wires or fibers such as carbon fiber or silicon carbide. Embedding fibers into the matrix in a certain direction creates an isotropic structure in which the alignment of the material affects its strength. Discontinuous reinforcement uses "whiskers", short fibers, or particles. The most common reinforcing materials in this category are alumina and silicon carbide.

Compared to monolithic metals, MMCs have: higher strength-to-density ratios, higher stiffness-to-density ratios, better fatigue resistance, better elevated temperature properties (Higher strength, lower creep rate), lower coefficients of thermal expansion, better wear resistance and dynamic damping. MMC reinforcements can be divided into five major categories: continuous fibers, discontinuous fibers, whiskers, particulates, and wires. With the exception of wires, which are metals, reinforcements generally include ceramics or nonmetallic compounds. Continuous fibers may include boron, graphite (carbon), alumina, and silicon carbide. A number of metal wires including tungsten, beryllium, titanium, and molybdenum have been used to reinforce metal matrices. Numerous metals have been used as matrices, including: aluminum, titanium, magnesium, nickel, cobalt, iron, and copper alloys and superalloys. The superior mechanical properties of MMCs drive their use. An interesting characteristic of MMCs, however, and one they share with other composites, is that by appropriate selection of matrix materials, reinforcements, and layer orientations, it is possible to tailor the properties of a component to meet the needs of a specific design. For example, within broad limits, it is possible to specify strength and stiffness in one direction, coefficient of expansion in another, and so forth. This is often not possible with monolithic materials. Monolithic metals tend to be isotropic, that is, to have the same properties in all directions.

Inertia welding is a welding process in which energy utilized to weld materials to one another is supplied primarily by stored rotational kinetic energy of the machine used for welding. As part of the process of inertia welding, one of two work pieces is typically connected to a flywheel and the other work piece is restrained from rotating. The flywheel is accelerated to a predetermined rotational speed, thereby storing a certain amount of energy. The drive motor is disengaged and the work pieces are forced together by the friction welding force. This causes the facing surfaces to rub together under pressure. The energy stored in the rotating flywheel is dissipated as heat through friction at the weld interface, thus welding the two surfaces together as the flywheel speed decreases ending with the weld stopping the flywheel. Because there is no melting of metal, solidification defects such as gas porosity, segregation or slag inclusions, do not typically occur. Joint preparation is not usually critical, and machined, saw cut, and even sheared surfaces are most often weldable. Resulting joints are of forged quality, with a complete butt joint weld through the contact area. No consumables, e.g., flux, filler, and shielding gases, are used and no weld splatter typically occurs. Sparks are minimal, as well.

Figure 2:
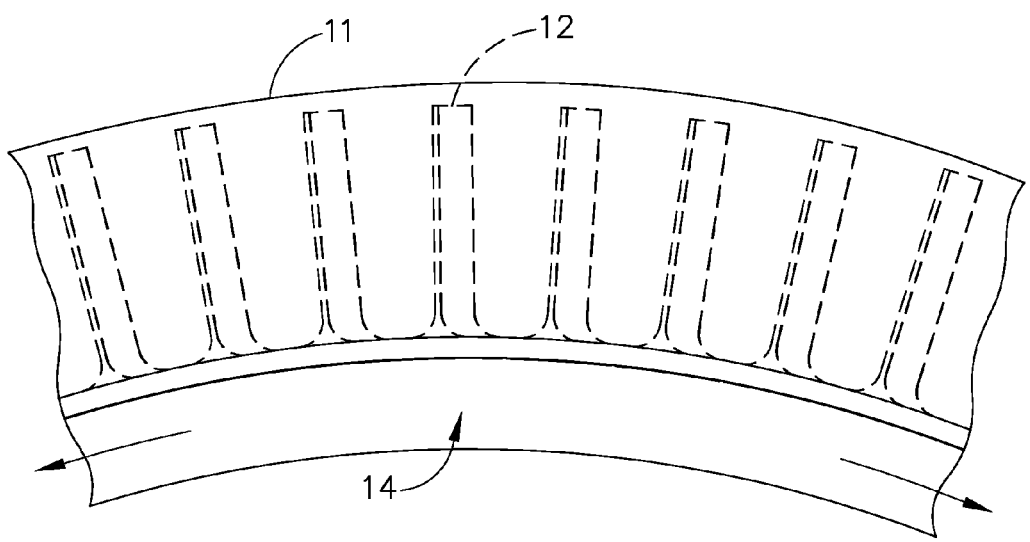
Figure 3:
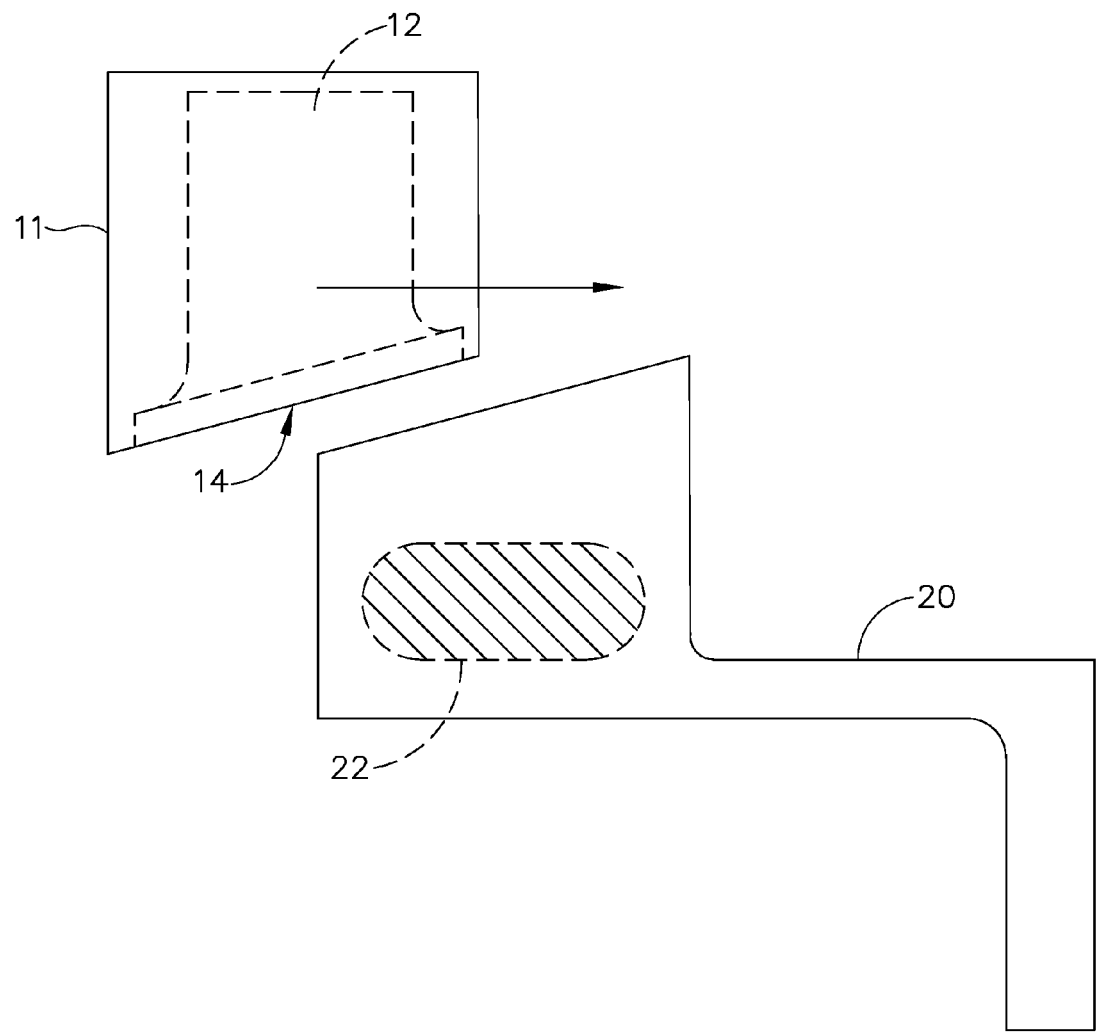
FIG. 3 is a cross-section of an exemplary airfoil component and blade and a cross-section of the MMC reinforced rotor ring of the present invention prior to inertia welding of the airfoil component and the ring component.

With reference to FIGS. 1-4, an exemplary embodiment of this invention provides a system and method for manufacturing a BLING rotor that includes an airfoil component 11 and a ring component 20. The airfoil component includes a plurality of individual airfoil blades 12, which have been formed (e.g. machined) from a single piece of material such as a cast or forged 360° ring to create a bladed rotor platform. As shown in FIGS. 1-2, the bottom portion of the 360° ring includes an angular welding region (i.e., a weld-prep surface) that forms an angular surface 14, which is referred to herein as a "conical surface", although other geometries are possible. Surface 14 may be convex, concave, or straight. As shown in FIGS. 2-3, ring component 20 includes a MMC reinforced core 22, which provides a zone in the rotor which is reinforced by layers or bundles of fibers that are typically oriented circumferentially in the direction of rotor rotation. Ring component 20 also includes a continuous angular or "conical" surface 24 that corresponds to the airfoil surface 14. Surface 24 may also be concave, convex, or straight.

Manufacturing fiber-reinforced (i.e., MMC) ring component 20, typically includes the step of forming a ring-like structure, wherein at least one fiber within the ring extends circumferentially in the direction of rotor rotation. The circumferentially oriented fiber may be a single continuous filament or material strand, a stack of multiple fiber layers oriented in a radial manner within the ring, or one or more untwisted bundles of continuous filaments or strands, i.e., a tow or tows. The fiber may be made from SCS6 or other ceramic or non-metallic materials having a carbon coating around the fiber outer surface to prevent reaction (e.g. oxidation of fiber core) between fiber and metal matrix during the HIP process. The fiber layer may also be made with at least one discontinuous or bundle of nano size whisker fiber arranged in random or circumferential directions or in layers. The coated fiber may be mixed with wet metal alloy slurry, e.g., Ti-alloy, Ni-alloy, Al-alloy or other powder metals with adhesive binder, by plasma spray, or by plasma vapor deposition method to hold fiber in place forming a metal matrix composite lamina. After the coated metal matrix composite lamina is stabilized in a layered shape, wind coated fibers are layered around a mandrel to form a ring shape structure. The metal matrix composite laminar ring is consolidated by HIP and/or by a sintering process in a carbon, TZM, or steel-tooling fixture. A region of additional material is typically included along the outer diameter of the fiber-reinforced ring. This "build-up region" is usually at least 0.5 inches (1.27 cm) in height and may be created by plasma spray of powdered metal, or by stacking metal foils to the thickness required. The build-up region is then consolidated by HIP and/or by a sintering process in a carbon, TZM, or steel-tooling fixture.

In the exemplary embodiment, airfoil component 11 is welded to the fiber-reinforced ring component 20 using inertia or friction welding methodology. As previously described, airfoil component 11 includes a bladed rotor platform having a continuous inwardly facing conical surface 14 oriented in a radial manner about the central axis of the rotor. Airfoil component 11 is mounted into one end of suitable inertia welding equipment. Ring component 20, which includes a continuous outwardly facing conical surface 24, is mounted into the other end of the inertia welding equipment. Ring component 20 is then rotated to a predetermined contact speed and brought into contact with the airfoil component 10, thereby forming a weld between the components using parameters typical for inertia welding. The inwardly facing conical surfaces are thus frictionally engaged with the outwardly facing conical surfaces under an axially applied weld load and a friction weld occurs between the two components at the angled surfaces. Heat generated by the inertia welding process does not typically affect MMC fiber or the general shape and/or geometry of the airfoils and the weld surfaces. Typically, the angle of each conical surface relative to the component on which it is formed is about 15°-75° relative to the centerline of rotation. Other angles are possible for affecting the engagement of BLING rotor components.

Figure 4:
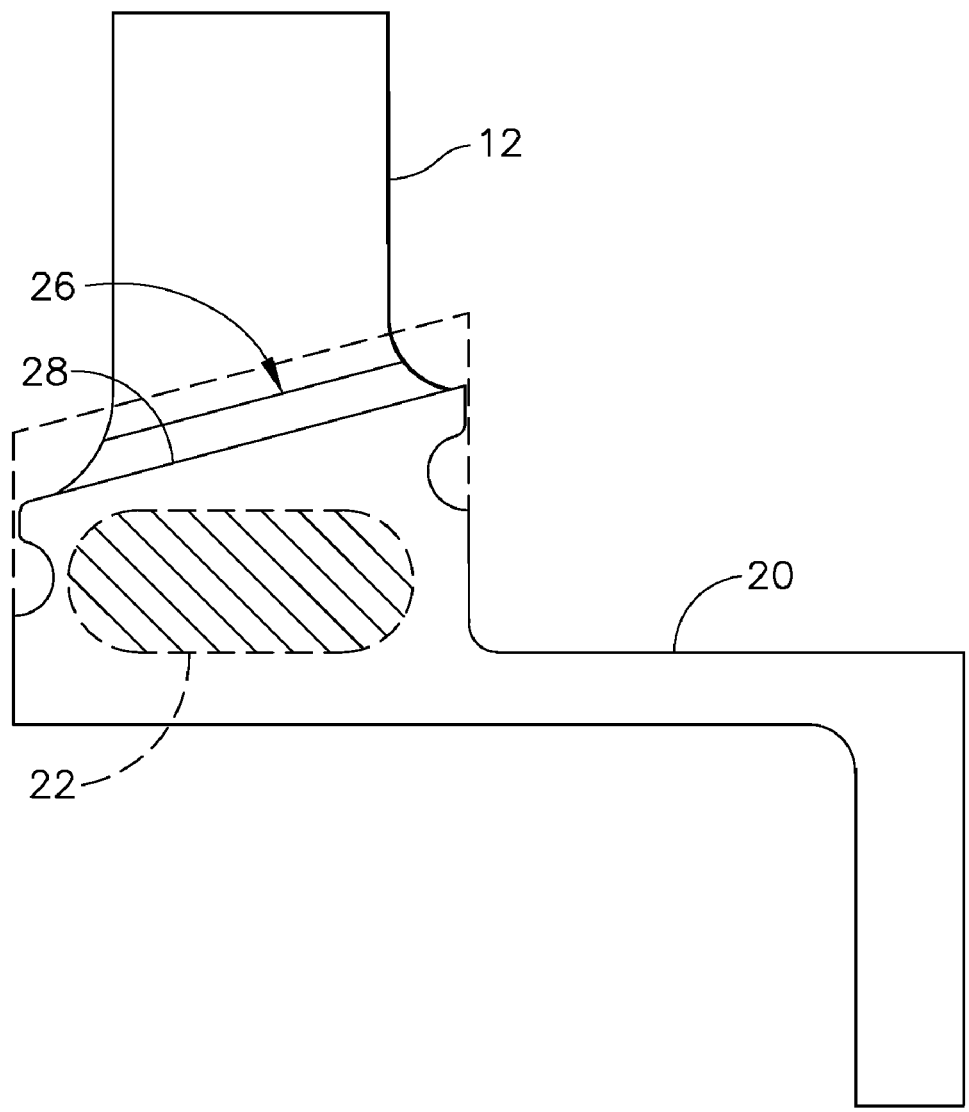
FIG. 4 is a cross-section of an exemplary airfoil blade and a cross-section of the MMC reinforced rotor ring of the present invention following inertia welding of the airfoil component and the ring component.

Once the weld is complete, the extra stock material around airfoil root 16 is removed by machining or other means to below the weld line, as is extra material at the periphery of ring component 20 that has been forced out from under the component interface during the inertial welding process. As shown in FIG. 4, this re-machined surface becomes inner flow path 26, thereby placing weld line 28 through each airfoil slightly above the inner flow path.

Following the inertia welding of the rotor components, the assembled BLING rotor is typically subjected to heat treatment sufficient to relieve internal stresses generated by the welding process and to restore materials properties that are important to the proper functioning of the gas turbine engine. As will be appreciated by the skilled artisan, the specific type of post-weld heat treatment will vary based on the materials, i.e., the alloys, used in creating the rotor. The inclusion of MMC in the airfoil component and/or ring component prevents or reduces inspection problems associated with excessive heat and or melting; thus, bond surface integrity may be inspected using conventional Eddy current, ultrasonic, or other non-destructive inspection (NDI) methods for detecting internal defects.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A system for manufacturing an integrally bladed rotor, comprising:
   (a) a ring component, wherein the ring component further includes:
      (i) at least one metal matrix composite; and
      (ii) a continuous radially outwardly facing conical surface;
   (b) an airfoil component, wherein the airfoil component has been created from a single piece of material and further includes a continuous, radially inwardly facing conical surface; and
   (c) inertia welding means for frictionally engaging under an axially applied weld load the ring component and the airfoil component to effect an inertia weld therebetween along the conical surfaces, wherein following the inertia welding of the airfoil component to the ring component, a quantity of material is removed around the base of each airfoil blade to a diameter smaller than the weld diameter between each conical surface.

2. The system of claim 1, wherein the ring component of the integrally bladed rotor extends circumferentially and axially relative to the rotor's center of rotation, wherein at least one reinforcing fiber is included within the ring, and wherein the reinforcing fiber extends circumferentially in the direction of rotor rotation.

3. The system of claim 2, wherein the circumferentially oriented fiber is a single, continuous, fiber tow.

4. The system of claim 2, wherein the circumferentially oriented fiber includes a stack of multiple fiber layers oriented in a radial manner within the ring.

5. The system of claim 4, wherein the fiber layers include nano-size whisker fibers arranged randomly, circumferentially, or in layers.

6. The system of claim 1, wherein the angle of each conical surface is about 15°-75° relative to the rotor's centerline of rotation.

7. An integrally bladed rotor, comprising:
  (a) a ring component, wherein the ring component further includes:
    (i) at least one metal matrix composite; and
    (ii) a continuous, radially outwardly facing conical surface;
  (b) an airfoil component, wherein the airfoil component has been created from a single piece of material and further includes: a continuous, radially inwardly facing blade conical surface; and
  (c) wherein the ring component and the airfoil component have been frictionally engaged with one another along the conical surfaces by inertia welding means under predetermined operating parameters, wherein following the inertia welding of the airfoil component to the ring component, a quantity of material is removed around the base of each airfoil blade to a diameter smaller than the weld diameter between each conical surface.

8. The rotor of claim 7, wherein the ring component of the integrally bladed rotor extends circumferentially and axially relative to the rotor's center of rotation, wherein at least one reinforcing fiber is included within the ring, and wherein the reinforcing fiber extends circumferentially in the direction of rotor rotation.

9. The rotor of claim 8, wherein the circumferentially oriented fiber is a single, continuous, fiber tow.

10. The rotor of claim 8, wherein the circumferentially oriented fiber includes a stack of multiple fiber layers oriented in a radial manner within the ring.

11. The rotor of claim 10, wherein the fiber layers include nano-size whisker fibers arranged randomly, circumferentially, or in layers.

12. The rotor of claim 7, wherein the angle of each conical surface is about 15°-75° relative to the rotor's centerline of rotation.

* * * * *